(12) United States Patent
Ballard

(10) Patent No.: US 6,182,050 B1
(45) Date of Patent: Jan. 30, 2001

(54) ADVERTISEMENTS DISTRIBUTED ON-LINE USING TARGET CRITERIA SCREENING WITH METHOD FOR MAINTAINING END USER PRIVACY

(75) Inventor: Clinton L. Ballard, Suquamish, WA (US)

(73) Assignee: Acceleration Software International Corporation, Poulsbo, WA (US)

(*) Notice: Under 35 U.S.C. 154(b), the term of this patent shall be extended for 0 days.

(21) Appl. No.: 09/086,233

(22) Filed: May 28, 1998

(51) Int. Cl.$^7$ ........................................... G06F 17/60
(52) U.S. Cl. ........................ 705/14; 709/217; 709/218; 709/219
(58) Field of Search ................. 705/14, 22; 455/4.2, 455/5.1, 5.5; 709/217, 218, 219

(56) References Cited

U.S. PATENT DOCUMENTS

| | | | | |
|---|---|---|---|---|
| 5,515,098 | * | 5/1996 | Carles ........................................ | 348/8 |
| 5,557,721 | * | 9/1996 | Fite et al. ................................ | 705/14 |
| 5,649,114 | * | 7/1997 | Deaton et al. .......................... | 705/14 |
| 5,721,827 | * | 2/1998 | Logan et al. ........................... | 455/4.2 |
| 5,740,549 | * | 4/1998 | Reilly ...................................... | 705/14 |
| 5,754,938 | * | 5/1998 | Hertz et al. ............................. | 345/27 |
| 5,754,939 | * | 5/1998 | Hertz et al. ............................. | 455/4.2 |
| 5,758,257 | * | 5/1998 | Hertz et al. ............................. | 455/4.2 |
| 5,826,165 | * | 10/1998 | Echeita et al. .......................... | 345/27 |
| 5,835,087 | * | 11/1998 | Hertz et al. ............................. | 345/327 |
| 5,848,397 | * | 12/1998 | Marsh et al. ............................ | 705/14 |
| 5,909,670 | * | 6/1999 | Trader et al. ........................... | 705/14 |
| 5,915,243 | * | 6/1999 | Smolen .................................... | 705/14 |
| 5,933,811 | * | 8/1999 | Angles et al. ........................... | 705/14 |
| 6,032,129 | * | 2/2000 | Greef et al. ............................. | 705/27 |
| 6,047,327 | * | 5/1996 | Tso et al. ................................ | 709/232 |

FOREIGN PATENT DOCUMENTS

11161716 * 6/1999 (JP) .

OTHER PUBLICATIONS

Whit; "Consumer Profiling Firely Proposes Clearinghouse for Sharing Information on Users"; Web Week, vol. 3, issue 5, Mar. 1997.*

Wang; "Keep in Touch: New Breed of Site Links People by Common Interest"; Webweek), Nov. 1997.*

"Whowhere Launches the WhoWhere Network"; Telephone IP News; vol.: 9 issue 4, Apr. 1998.*

"Capitalizing on abundance of targeting opps for banners ads"; Interactive Marketing News vol.: 4 issue: 10, Mar. 1997.*

Lawrence; "Charging per inquiry: A new metric for online advertsing"; Seybold Report on Internet Publishing vol.: 2 p.: 3(5p), May 1998.*

Gallagher; "A framework for targeting banner advertising on the Internet"; Faculty of Business Adminstration, Memorial University of Newfoundland, Mar. 1997.*

* cited by examiner

*Primary Examiner*—James P. Trammell
*Assistant Examiner*—Romain Jeanty
(74) *Attorney, Agent, or Firm*—Steven P. Koda

(57) ABSTRACT

Matching between advertisement and target consumer is achieved in a system which maintains consumer privacy. Such system includes computer end users, an advertising service provider and advertisers. Computer end users subscribe to the advertising service provider. The advertising service provider sells time or other accountable units to the advertisers. The advertiser provides the advertisement. Each advertisement has accompanying demographic information or a desired affinity ranking. The end user completes a demographic questionnaire and ranks various categories of products and services. The advertising service provider sends executable filter programs which run on the end user computer to test whether a corresponding advertisement is to be downloaded and displayed. Alternatively, the user sends out a request for advertisements to the advertising service provider, and the advertising service provider finds advertisements meeting the target demographics requested by the end user or which comply with the affinity rankings.

9 Claims, 3 Drawing Sheets

ADVERTISEMENTS DISTRIBUTED ON-LINE USING TARGET CRITERIA SCREENING WITH METHOD FOR MAINTAINING END USER PRIVACY

BACKGROUND OF THE INVENTION

This invention relates to methods and apparatus for advertising, and more particularly to methods and apparatus for the distribution of advertisements to consumers.

Advertising is a nonpersonal form of communication conducted through paid media under clear sponsorship having a purpose of informing, persuading or reminding target buyers or publics of the sponsor's goods, services or goodwill. A sponsor's ultimate goal is that an advertisement result in the sales of the sponsor's goods or services. To have the desired effect advertiser's typically tailor their advertisement to a target consumer group—consumers likely to desire or have need of the goods or services. The advertiser also selects a distribution media through which such targeted consumer group is likely to be exposed to the advertisement.

In defining the target consumer group and the method of distribution it is common to use consumer demographics. Demographics are characteristics of human populations and population segments. A population can be segmented by such demographics. Common examples are age, sex, income, race, nationality, religion, address, level of education, occupation, and number of children. Other demographics include hobbies, interests, credit history, travel history, and past purchasing history. There are many others ways in which populations can be analyzed to identify population segments that may be appropriate for an advertiser to target.

Once an advertiser has selected a target consumer group and prepared an advertisement for such group, the advertisement needs to be delivered to such group. Thus, magazines tailored for specific consumer groups are a popular means for a sponsor to reach their target group. Another means is by direct mail. The advertising industry has matured to the point of buying and selling mailing lists of people having specific demographic attributes. In addition, large clearinghouse lists of many consumers are easily formed using today's electronic media. A sponsor may purchase information for a list of consumers meeting desired demographic attributes and then send their advertisement to all such consumers. The more consumers that fit the desired demographic, the more likely that a sale will result from an advertisement to such consumers.

This sale of mailing lists and compilation of consumer information is beneficial to the sponsor, but is a challenge to the notion of consumer privacy. As listed above, one can readily obtain a person's credit history, income level, and purchase history. It is a real concern that the same data can be used for unscrupulous, illegal, or undesired purposes (e.g., to coerce, defraud, or investigate a specific individual). It is when such lists are used to find information on a specific individual that privacy becomes severely challenged. Accordingly, there is a need for advertisers to be able to reach target consumers within a system which protects consumer privacy.

SUMMARY OF THE INVENTION

According to the invention, matching between advertisement and target consumer is achieved in a system which maintains consumer privacy. Such system includes at least three levels: computer end users, advertising service providers and advertisers. Computer end users subscribe to the advertising service provider. To lure such subscribers, the consumer may be offered reduced prices for software or on-line service or may be offered another benefit. The advertising service provider then sells time or other accountable units to the advertisers. For example, the advertising service provider may charge a specific price to distribute a specific advertisement to a certain number of end users within a certain period of time. The advertiser provides the advertisement (e.g., advertisement copy; web page address which embodies the advertisement).

According to one aspect of the invention, associated with each advertisement is target criteria information (e.g., desired demographic information, a desired affinity ranking, or a target criteria filter). Such information is determined by the advertiser. In addition, there is playback criteria associated with each advertisement. Playback criteria determines the range of dates or times during which the advertisement may be shown, and any limitation on the number of times the advertisement may be shown. The playback criteria is determined by the advertiser service provider. The target criteria information and playback information is stored on an advertising service provider computer.

According to another aspect of the invention, information about the end user corresponding to the target criteria information is stored at the end user computer. In one implementation, the end user completes a demographic questionnaire and ranks their affinity for various categories of products and services. The specificity of such products and services may vary according to the embodiment. The end user may change their affinities and demographic data at any time. In some embodiment, the affinity rankings change dynamically based upon the end user's computing or on-line browsing habits.

In a highest security embodiment, the target criteria information is a target criteria filter. The end user computer receives the target criteria filter for all or a subset of potential advertisements. According to one aspect of the invention, the target criteria filter is executable code. The end user computer executes each of the target criteria filters to determine which advertisements are to be displayed on the end user computer. Each target criteria filter generates a normalized output which allows the results of each filter to be ranked. Such rankings are used to determine which advertisements are to be displayed. Each target criteria filter requests input data from the end user computer. Such input data corresponds to all or a portion of the end user information (e.g., demographic data, affinity ranking data, or other data statically or dynamically derived from the end user computer). According to an alternative aspect, the target criteria filter is a set of parameters for a generic filter stored on the end user computer. Thus, executable code need not be downloaded to implement the filter. There may be one or more generic filters used for a select one or more advertisements. An advantage of the target criteria filter embodiments is that the processing of the end user information occurs on the end user computer. Such information need not be downloaded to the advertising service provider. The end user computer determines which advertisements are to be displayed. The end user computer sends a message to receive the advertisement. In one embodiment, the advertising service provider computer receives the message and downloads the advertising copy to the end user. In another embodiment, the advertisement is accessed as a web page. The end user computer displays the web page of select advertisements.

According to another aspect of the invention, the end user computer reports accounting type information to the advertising service provider. Such accounting information includes an advertisement identification (e.g., name or code), a time and date stamp of when the advertisement was displayed on the end user computer, and the duration for which the advertisement was present on the display screen of the end user computer. Additional information also may be reported, such as where the end user hyperlinked to from the advertisement (e.g., for a web page advertisement).

According to another implementation, the selection of an advertisement to be displayed is performed on the advertising service provider computer rather than the end user computer. Although, key information such as the end user's name, address or other private data need not be sent to the advertising service provider, demographic or affinity data may be sent. In one embodiment the end user computer sends out a request for advertisements to the advertising service provider. The number of advertisements sent or the frequency such requests are made is prescribed or programmed, and determines the amount of advertising to occur. The request includes demographics which the target advertisement is to meet. In some embodiments, the request also includes an affinity ranking by advertising category.

According to another aspect of the invention, the advertising service provider then finds advertisements meeting the target demographics requested by the end user which comply with the affinity rankings. Such advertisements are down loaded to the end user. In an alternative embodiment, the advertisements need not be sent electronically, but instead may be sent through the conventional mail system. For electronical downloading, the advertisements are stored on the end user computer and displayed intermittently. Such advertisements may appear as banners during a user's on-line browsing. Alternatively, such advertisements may be displayed off-line. For example, advertisements may be displayed at system start-up or during program load times. Accounting information as described above is reported to the advertising service provider.

Whether the selection of advertisements is performed at the end user computer or the advertising service provider computer, various methods of matching end user (consumer) and advertisement may be used.

According to one method of matching consumer and advertisement, absolute reverse demographic matching are used. The advertiser specifies demographics for the advertisement. When the end user demographics specified in the user's request fits such advertisement demographics, then such advertisement is sent to the end user computer.

According to another method of matching consumer and advertisement, relative reverse demographic matching is used. A distance function is defined in software at the advertising service provider computer. Such function identifies the advertisements that have demographics most closely fitting the demographics in the end user's request.

According to another method of matching consumer and advertisement, absolute affinity ranking is used. The end user ranks advertising categories according to an absolute affinity scale. An advertisement has one or more of such categories. The advertisement also include corresponding affinity range data. specifically, the advertiser desires such advertisement be sent to any consumer having an affinity for the specified category that falls within such affinity request range. The advertising service provider then sends advertisements which have an affinity request range encompassing the end user's affinity level for the category.

According to another method of matching consumer and advertisement, relative affinity ranking is used. This is similar to absolute affinity ranking above, but only the advertisements having the highest affinity range values are selected.

According to another aspect of this invention, both demographic and affinity selection methods can be used to select a method for matching consumer and advertisement.

According to another aspect of this invention, rather than send demographic or affinity data from an end user to the advertising service provider, the advertising service provider sends the end user computer a packet for each potential advertisement. Such packet includes program code which is executed on the end user computer. The program reads the demographic or affinity data on the end user computer and determines whether the advertisement is to be shown to the end user. If so, then the end user computer requests that the advertisement be downloaded to the end user for storage and later viewing. An advantage of this method os the higher level of privacy for the end user. The downloaded program code may vary for each advertiser or advertisement. In addition, the end user information used by the program and read from the end user computer may vary for each advertiser or advertisement.

According to one advantage of this invention, an advertiser is able to reach consumers who fit desired demographic or affinity parameters while a consumer's privacy is retained. According to another advantage of this invention, an effective way of reaching consumers having an affinity for an advertiser's goods or services is achieved. According to another aspect of this invention, an end user is able to achieve a benefit such as reduced cost by accepting advertising on their computer. According to another advantage of this invention, an end user can impact the advertisements displayed by their demographic information and affinity rankings. According to another aspect of this invention, an advertising service provider can protect the identity of computers making requests for advertisements, and thus preserve the end user's privacy. These and other aspects and advantages of the invention will be better understood by reference to the following detailed description taken in conjunction with the accompanying drawings.

DESCRIPTION OF SPECIFIC EMBODIMENTS

Overview

The advertising distribution system is implemented at least in part on a wide area network of computers. Wide area networks such as the internet, and similar intranets, are being used increasingly for accessing information and for communicating among individuals and businesses. Conventionally, an end user computer accesses the wide area network by a wired or a wireless transfer medium. A user accesses the internet, for example, using a modem and the standard telephone communication network. Alternative carrier systems such as cable and satellite communication systems also are being contemplated for delivery of internet and wide area network services. The formal definition of the "Internet" is the global information system that (i) is logically linked together by a globally unique address space based on the Internet Protocol (IP) or its subsequent extensions/follow-ons; (ii) is able to support communications using the Transmission Control Protocol/Internet Protocol (TCP/IP) suite or its subsequent extensions/follow-ons, and/or other IP-compatible protocols; and (iii) provides, uses or makes accessible, either publicly or privately, high level services layered on the communications and related infrastructure. The term "Internet" is commonly used to refer to the physical structure, including client and server computers and the phone lines that connect everything into a global information system. The common categories of information services available over the internet include information retrieval services, information search services, communication services, and multimedia information services. The information retrieval services include FTP and Gopher. The information search services include WAIS, Archie, and Veronica,. The communication services include Email, Telnet, USENET, and IRC. The multimedia information services include the World Wide Web (WWW).

Figure 1:
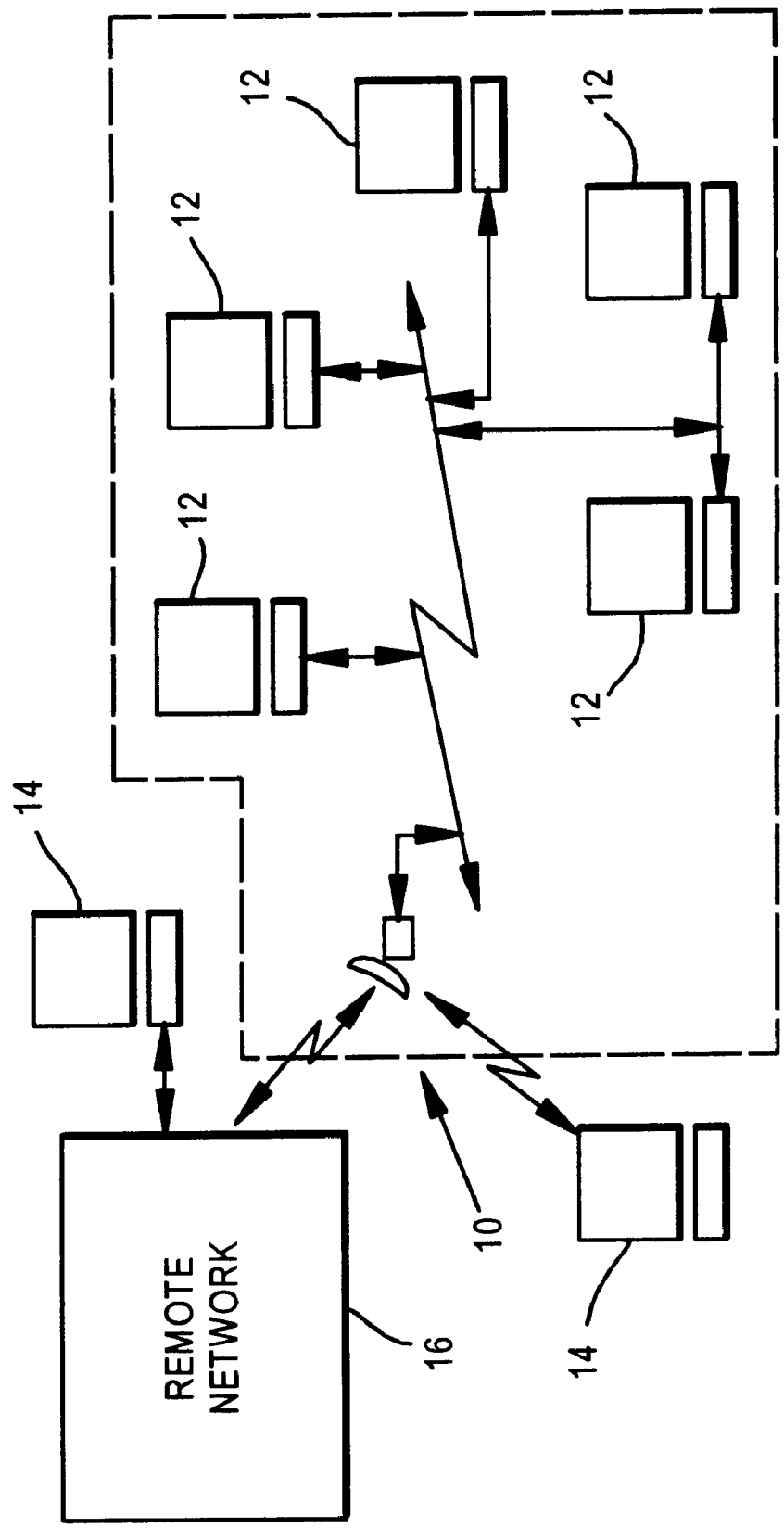
FIG. 1 is a schematic diagram of a wide area network.

FIG. 1 shows a wide area network 10 formed by a plurality of network server computers 12 which are interlinked. Each network server computer 12 stores data accessible to other network server computers 12 and to client computers 14 and networks 16 which link into the wide area network 10. The configuration of the wide area network 10 may change over time as client computers 14 and one or more networks 16 connect and disconnect from the network 10. For example, when a client computer 14 and a network 16 are connected with the network servers computers 12, the wide area network includes such client computer 14 and network 16. As used herein the term computer includes any device or machine capable of accepting data, applying prescribed processes to the data, and supplying results of the processes.

The wide area network 10 stores information which is accessible to the network server computers 12, remote networks 16 and client computers 14. The network server computers 12 are formed by main frame computers minicomputers, and/or microcomputers having one or more processors each. The server computers 12 are linked together by wired and/or wireless transfer media, such as conductive wire, fiber optic cable, and/or microwave transmission media, satellite transmission media or other conductive, optic or electromagnetic wave transmission media. The client computers 14 access a network server computer 12 by a similar wired or a wireless transfer medium. For example, a client computer 14 may link into the wide area network 10 using a modem and the standard telephone communication network. Alternative carrier systems such as cable and satellite communication systems also may be used to link into the wide area network 10. Still other private or time-shared carrier systems may be used. In one embodiment the wide area network is a global information network, such as the internet. In another embodiment the wide area network is a private intranet using similar protocols as the internet, but with added security measures and restricted access controls. In still other embodiments the wide area network is a private, or semi-private network using proprietary communication protocols.

The client computer 14 is any end user computer, and may also be a mainframe computer, minicomputer or microcomputer having one or more microprocessors. The remote network 16 may be a local area network, a network added into the wide area network through an independent service provider (ISP) for the internet, or another group of computers interconnected by wired or wireless transfer media having a configuration which is either fixed or changing over time. Client computers 14 may link into and access the wide area network 10 independently or through a remote network 16.

Computer System

Figure 2:
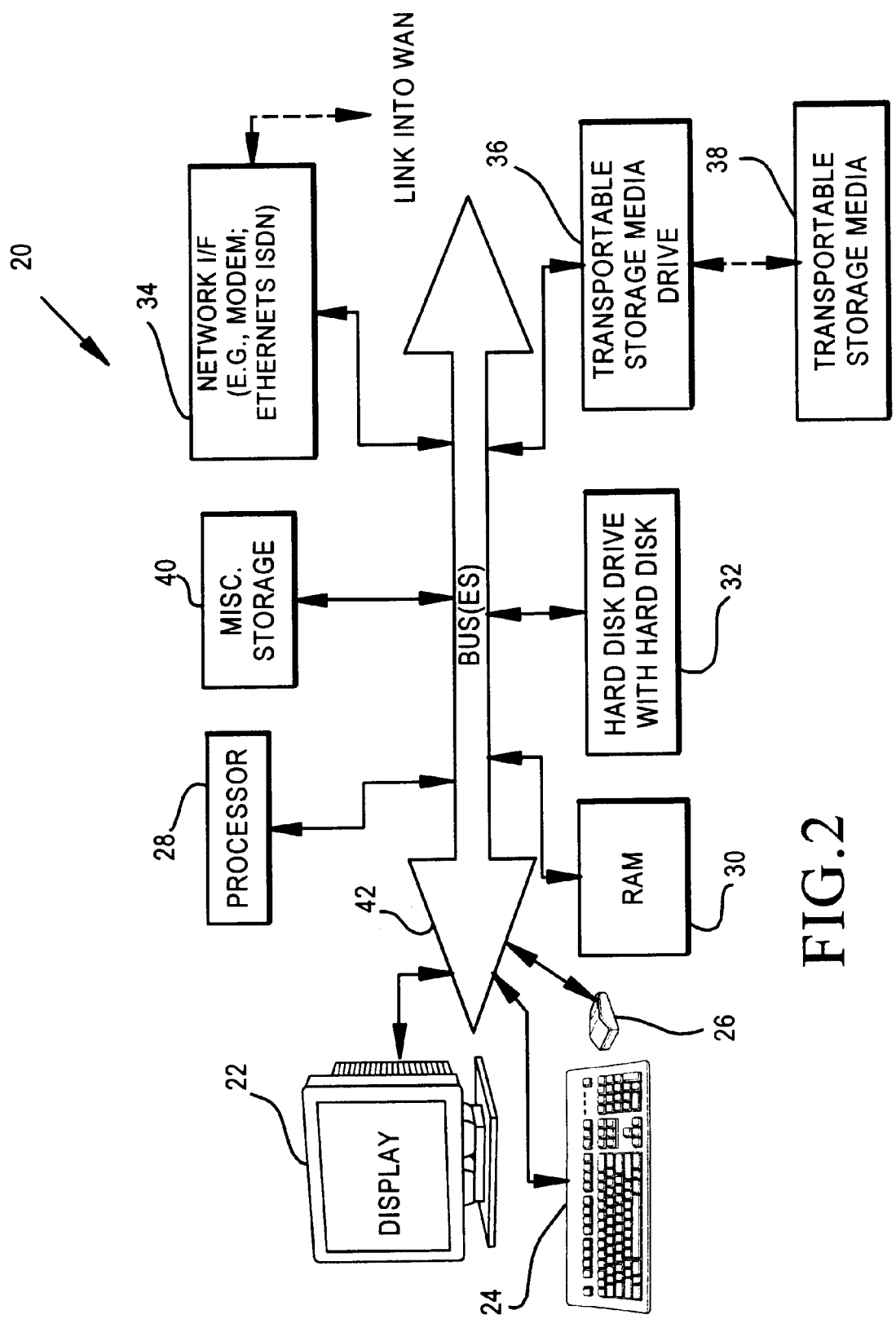
FIG. 2 is a block diagram of a computer system for a computer connected into the wide area network of FIG. 1.

The functions of the present invention preferably are performed by programmed digital computers of the type which are well known in the art, an example of which is shown in FIG. 2. A computer system 20 has a display monitor 22, a keyboard 24, a pointing/clicking device 26, a processor 28, random access memory (RAM) 30, a non-volatile storage device such as a hard disk drive 32, a communication or network interface 34 (e.g., modem; ethernet adapter), and a transportable storage media drive 36 which reads transportable storage media 38. In addition other miscellaneous storage devices 40, such as a floppy disk drive, CD-ROM drive, zip drive, bernoulli drive or other magnetic, optical or other storage media, may be included. The various components interface and exchange data and commands through one or more busses 42. The computer system 20 receives information by entry through the keyboard 24, pointing/clicking device 26, the network interface 34 or another input device or input port. The computer system 20 may be any of the types well known in the art, such as a mainframe computer, minicomputer, or microcomputer and may serve as a network server computer 12, remote network 16 computer or a client computer 14. The computer system 20 may even be configured as a workstation, personal computer, network server, or a reduced-feature network terminal device.

Advertising Distribution Functional Flow Diagram

Figure 3:
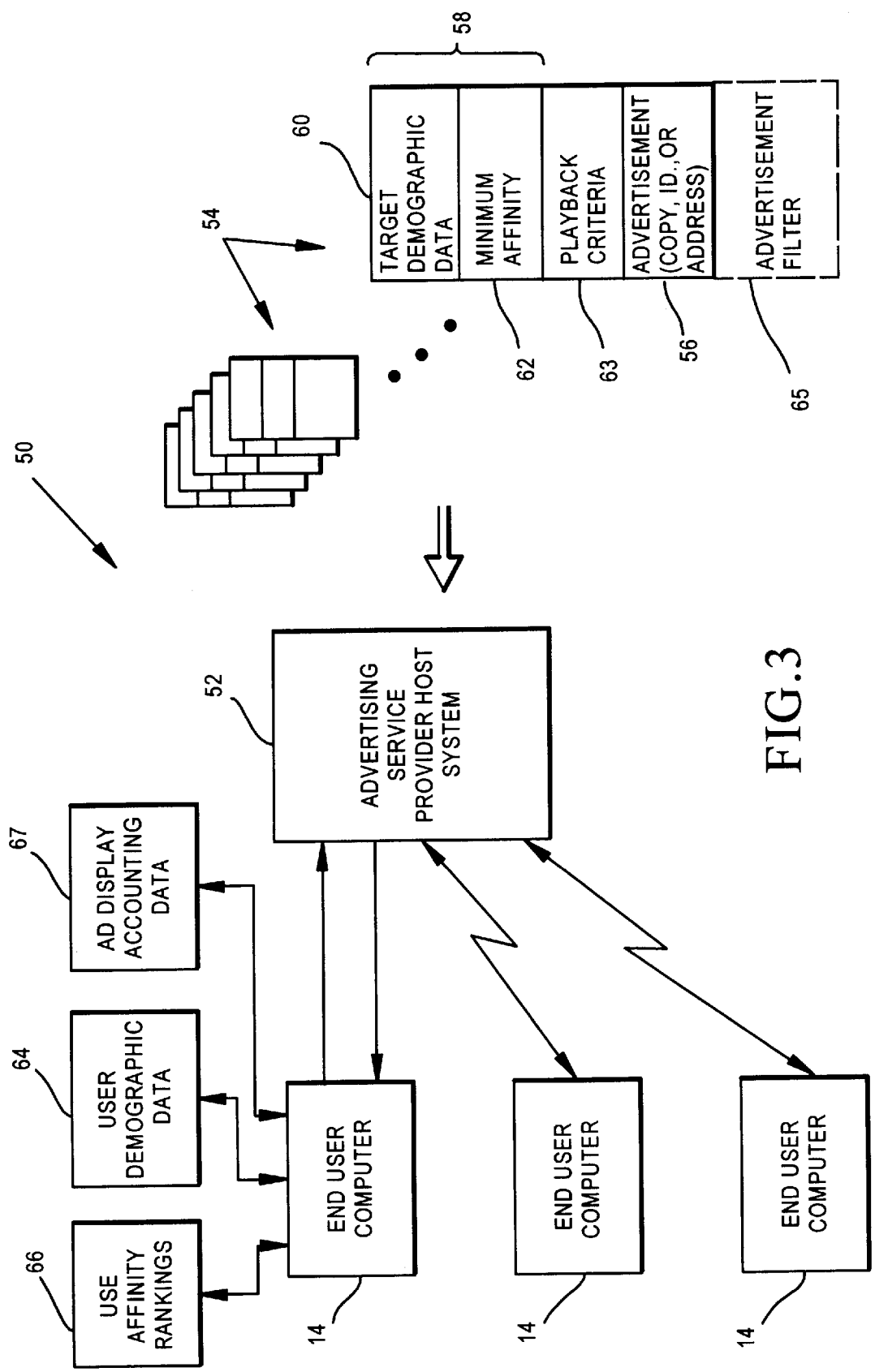
FIG. 3 is a block diagram of an advertisement distribution system according to an embodiment of this invention.

FIG. 3 shows a functional block diagram of a computer network 50 implementing the advertising distribution system according to various embodiments of this invention. The network 50 is part of or connected into the wide area network 10 of FIG. 1. The network 50 includes an advertising service provider (ASP) computer system 52 and multiple end user computers 14. The ASP computer system 52 serves as one of the network server computers 12 or a server computer in a remote network 16 (see FIG. 1). The end user computers 14 are linked to the ASP computer 52 in a manner as described above for connecting the end user computers 14 to the network server computers 12 and remote network 16. The ASP computer 52 and end user computers 14 are embodied by a computer system 20 as described above with regard to FIG. 2.

The ASP computer 52 stores or has access to advertisement information 54. The advertisement information 54 pertains to advertisements and in some embodiments includes the advertisements 56 or an address to the advertisement (as for a web page). Each advertisement is for promoting one or more goods, services, causes or goodwill. The object of the advertisement, the good, service, cause, or goodwill, is referred to herein as a product. The advertisement information 54 includes target criteria data 58 which identifies characteristics of consumers likely to find desire or be interested in a product of the corresponding advertisement. There is target criteria data 58 for each corresponding advertisement 56, whether or not the advertisement is stored with the information 54. In embodiments where the advertisement is to be sent electronically over the network 50 (e.g., by fax or modem), the advertisement is stored electronically and linked to the target criteria data 58. In embodiments where the advertisement is to be sent via messenger carrier (e.g., postal service), the advertisement itself need not be stored with the advertisement information 54, although a scheme for associating the advertisement with the target criteria data 58 is still implemented (e.g., a pointer value corresponds to the advertisement; or an advertisement code is stored with the target criteria data 58).

In one embodiment the target criteria data 58 includes target demographic data 60. The target demographic data 60 specifies the demographics of consumers most likely to be interested in the product for the corresponding advertisement. Such interest typically is determined by market research in which a niche is identified and a group of the consuming public is targeted. Exemplary demographic data may include one or more of the following types of demographic information: an age group, a sex, an income range, race(s), nationality(ies), religion(s), an address (e.g., city), a level of education, occupation(s), and number of children. Other demographic criteria which is used include hobbies, interests, credit history, travel history, and past purchasing history. In addition, there are many others ways in which populations can be demographically analyzed to identify target population segments that may be appropriate for an advertiser to target to promote a given product.

In another embodiment the target criteria data 58 includes minimum affinity ranking data 62. The advertiser specifies a minimum affinity ranking a consumer is to exhibit toward the product of the corresponding advertisement. If such affinity ranking is met, then the advertiser desires that the corresponding advertisement be sent to the consumer. An affinity ranking is a scaled value which the end user specifies for a specific product or product category. Alternatively or in addition, an affinity ranking may be determined programmatically by analyzing an end user's computing habits/history, on-line browsing habits/history or on-line purchasing habits/history. Product categories may be standard industrial categories (e.g., automobiles) or other categories, such as for specific products (word processing software) or brands of products (e.g., Acceleration Software International Corp. products). The number of categories and the degree of specificity may vary for differing embodiments and within a given embodiment.

The target criteria data 58 includes the target demographic data 60, or the minimum affinity ranking data 62, or both of the target demographic data 60 and the minimum affinity ranking data 62.

The advertising information 54 also includes playback criteria 63. Playback criteria are constraints placed on the timing for displaying advertisements by the advertising service provider. For example, the ASP may price their service for an advertisement to be shown only during certain hours and only for a given period of time. Various criteria may be implemented according to a desired business model. In one embodiment the playback criteria includes a start data and an expiration date. The corresponding advertisement is only to be displayed between such dates. In another embodiment a time of day range, an absolute number of times to display the ad (or a number of times per day, week, . . . ), or an absolute amount of display time duration for the ad (or per day, week, . . . ) also is included.

Each end user computer 14 participating in the advertisement distribution system stores demographic data 64 and/or affinity ranking data 66 for one or more consumers which may use the end user computer 14. In addition, accounting data 67 is maintained which tracks the displaying of advertisements on the end user computer. To obtain the demographic data, in one embodiment an end user completes a questionnaire which gathers demographic information about the end user. Such demographic data corresponds to any one or more of the demographic data criteria described above. Such demographic data is fixed, but may be altered by the end user. Alternatively, software executed by the end user computer 14 may vary and update the demographic data based upon time, computing habits/history, on-line browsing habits/history or on-line purchasing habits/history, where relevant.

To obtain the affinity data, an end user completes a questionnaire which gathers affinity ranking data for select product categories. Such product categories preferably correspond to the product categories used by the advertising service provider computer 52 for the advertiser minimum affinity ranking data 62. A subset of such categories, or categories which correlate to the categories of the affinity data 62 may be used also.

To gather the accounting data 67, the display of advertisements at the end user computer is monitored by the end user computer. Information such as a time-date stamp is obtained each time an advertisement is displayed, along with a duration time during which the advertisement is on the display screen. An identification code accompanies an accounting data entry to associate an entry with a particular advertisement. The accounting data 67 is particularly beneficial for embodiments in which the advertisement may be displayed while the end user is either on-line of off-line and allows the distribution system to be automated over a public network such as the Internet. The end user computer sends the accounting data to the ASP computer 52 allowing the ASP computer 52 to report to or assure the advertisers that a given advertisements was shown.

In some embodiment the advertising information 54 includes executable computer program code which serves as an advertising filter 65. The target criteria data 54 serve as parameter inputs for the filter. In addition, information from the end user computer (e.g., a portion of the demographic data 64, affinity data 66 or other data derived from the end user or end user computer serve as inputs to the advertising filter. Preferably the advertising filters for multiple advertisements are designed to generate a normalized output which enables the results of many advertising filters to be ranked. In some embodiment the ranked outputs are used to select advertisements to be displayed. In some embodiments the advertising filters are executed at the service provider computer 52. In other embodiments the advertising filters are executed at the end user computer 14. In still other embodiments, the end user computer stores one or more generic advertising filter computer programs. Target criteria information 58 are then received from the advertising service provider computer 52 as serve as parameters for testing the end user information 64 or 66 for the advertisement corresponding to the parameters.

Advertising Distribution Methods

The advertising distribution system has participating advertisers and participating consumers. The business model for achieving such participants may vary. The participating advertisers submit advertisements (or web page addresses, in which the web page serves as the address) and corresponding advertisement information (e.g., target criteria, advertising filter) to the advertising service provider. For each advertisement there is corresponding advertising information.

The target criteria is formatted and stored on the ASP computer 52 for use as target criteria data 58 for the corresponding advertisement. For electronic distribution the advertisement is stored electronically as advertisement 56.

According to alternative embodiments the selection of advertisements occurs at either the ASP computer 52 or the end user computer 14. Processing at the end user computer 14 has an advantage of added privacy for the end user. In particular end user data is not sent to the ASP computer 52 in such embodiment.

Embodiment with Advertisement Selection Screening at ASP Computer

The participating consumers install a software program on their computer 14 which gathers end user data, serves as a message content manager, performs playback screening and provides display ad accounting. The data gathering software provides an interface for the end user(s) to fill out the target criteria questionnaire(s) and in some embodiments monitors the computing activities to update an vary the end user data. The end user data includes the demographic data and/or affinity ranking. Additional data derived by the end user computer also may be included. In this embodiment advertisements are first screened at the ASP computer 52 to determine whether the end user is likely to be interested in viewing given advertisements. The message content manager periodically or aperiodically forms a message to be sent to the ASP computer 52. Such message may be by a direct telephone modem connection, or by a public or private network modem, wired or wireless connection. For example, in one embodiment messages are sent while an end user is logged onto the internet. Such message transmission may be transparent to the end user. An end user may simply be browsing on the world wide web with the messages sent to the ASP computer 52 via internet service provider computers (e.g., a computer 12 in FIG. 1). The frequency or timing of the message communications may vary for different embodiments and for different types of participation.

To maintain a degree of privacy for the end user specific end user information such as name, address, social security number, and specific financial data is not sent in a message. For advertisement distribution based on affinity ranking, the message content manager selects one or more product categories and corresponding affinity rankings in the affinity ranking data 66.

Various methods may be used to select the product categories to include in a message. In one method the message content manager randomly selects a product category. In another method, sequential messages specify the product categories in descending affinity ranked order. Each message is sent to the ASP computer 52. The ASP computer 52 then selects one or more advertisements that conform to the advertising category and affinity ranking and sends the advertisements to the end user via modem, fax and messenger service (e.g., postal service).

For advertisement distribution based on demographic data, the message content manager sends a request to the ASP computer to send an advertisement which conforms to a included set of demographic parameters. Such information is sent to the ASP computer 52. The ASP computer 52 then selects one or more advertisements that conform to the demographic data and sends the advertisements to the end user via modem, fax and messenger service (e.g., postal service). In another embodiment both affinity data and demographic data are sent.

For embodiments in which the ASP computer 52 responds by a modem transmission, the ASP computer 52 need not receive or access private information pertaining to the end user. The advertisements are simply downloaded over the current on-line connection. For a fax transmission the advertising service provider needs to access a fax number to send the advertisement. Such number may be included in the message sent from the end user computer 14 or may be accessed from a data base at the ASP computer 52 using a code to identify the end user. For the messenger service delivery, complete name and address information of the end user needs to be accessed to the advertising service provider. To maintain end user privacy such information preferably is not sent in the content of the message from the end user computer 14 to the ASP computer 52. Preferably, the ASP computer 52 is able to look up the name and address information in a secure data base and cause the advertisement to be mailed to the end user without having such information accessible on-line.

Once the ASP computer 52 makes the selections, the advertisements or identifications (e.g., web page address) of the selected advertisements are sent to the end user computer along with the playback criteria. The end user computer 14 stores the advertisements or identifications and the playback criteria. A playback manager program determines when to display an advertisement on the end user computer. For example, ads may be displayed while the end user is off-line and the computer is idle, or while the computer is loading a program. In some embodiments ads may be scheduled at specific times and may preempt the display or may appear as a banner across a portion of the display. In other embodiments the ads appear while the user is on-line. In some embodiments the advertisement is a web page accessible over the internet. In such case, the advertisement still may be displayed while on-line or off-line. If requested while off-line then the web page is immediately displayed if a copy is stored on the end user computer. Otherwise, the end-user computer establishes an on-line connection to retrieve the web page. In some instances the web page may be located in memory and displayed without having to go on-line. If such web page includes hyperlinks and the end user clicks on a hyperlink then an online connection is formed. As still another alternative the hyper-link function can be disabled while the end user is off-line (e.g., if desired by the end user).

For each advertisement displayed on the end user computer according to the methods of this invention, the ad display manager program stores an accounting entry into a log of ad display accounting data 67. The entry includes an identification code for the advertisement, a time and date stamp and a time duration during which the advertisement was shown. In some embodiments, the entry also includes a destination web page of where the end user hyper-linked to after viewing the advertisement. The ad display accounting data 67 is sent to the ASP computer 52 periodically or aperiodically. Such accounting data 67 enables the advertising service provider to provide information to the participating advertisers concerning their advertisements. Such information also may be used for determining the value of the advertisement bandwidth provided by the ASP 52 and for determining how much to charge participating advertisers.

Following are descriptions of different screening techniques for processing a message to select advertisements to be displayed at the end user computer 14:

Absolute Reverse Demographic Selection Method

For absolute reverse demographic selection, the advertiser specifies the desired demographics of consumers. The message content manager at the user computer sends a message request which specifies consumer demographics. The ASP computer determines which advertisements having target criteria demographics into which the consumer's demographics fit. One or more advertisements that conform to the request are sent to the end user. It is likely that many advertisements in the advertizing service provider's data base may encompass the consumer's demographics. The ASP computer 52 uses a business model to determine which advertisements to send. For example, advertiser may pay to have their ad distributed to a requisite number of end users within a specific period of time. The ASP computer 52 manages the distribution to conform to the advertising contracts, while also screening using the selection method described above. The specific advertisement selected of the many that fit the selection criteria thus may be based upon a time slot, a number of end users to receive the advertisement or another method of pricing on-line or direct mail advertisement distribution.

Relative Reverse Demographic Selection Method

For relative reverse demographic selection, either the end user computer 14 or the ASP computer 52 implement a distance function for the consumer demographics. The distance function provides a range around the specific consumer demographic information to expand the consumer values for one or more demographic data criteria. Such increased range increases the number of advertisements which have target demographics encompassing the end user's demographics.

The ASP computer 52 selects a pool of advertisements from which to choose for a given message. The ASP computer 52 calculates the distance function for each advertisement in the current and sends the advertisements having the smallest distance. Following is an exemplary distance function:

Distance=0
For every DDD(i)
  Distance+=minimum of Distance (a) (DDD(i).b, DV(a), DDD(i).d) and Distance (a) (DDD(i).c, DV(a), DDD(i).d);
  DD(t)+=Distance/number of DDD's in the advertisements
where, DDD(n)=n desired demographic descriptors: a, b, c, d
  DV(N)=demographic values for all demographics including a, b, c and d Absolute Affinity Ranking Selection Method For absolute affinity ranking, the end user computer 14 sends affinity rankings and category identifications for one or more categories. The categories can be determined by alternating categories, by random selection, by choosing the categories with the highest affinity ranking or another method. In one method the ASP computer 52 sends the end user computer 14 a subset of categories for which the end user may request advertisements. The end user computer then implements one of the above methods (e.g., round-robin, random, highest affinity) to select the categories to be specified in the message to the ASP computer 52. Another variation is for the end user computer to rotate or select only from the categories, (or the subset of categories specified by the ASP computer 52) for which the user affinity ranking is above some prescribed or programmable threshold level.

The ASP computer 52 then processes the message by finding advertisements which specify minimum affinity rankings less than the end user's affinity rankings for the categories corresponding to such advertisements. The ASP computer 52 selects the advertisements based on random selection, highest user affinity, rotating selection, or a variation on one of these methods from a specified subset of advertisements. The subsets may be defined for example based on the day or time. Such determination is useful for pricing the advertisement for a certain day or time period.

Relative Affinity Ranking Selection Method

Relative affinity ranking is the same as the absolute affinity ranking method except that the advertisements which specify the highest requisite affinity for the minimum affinity are prioritized. Because the desired affinity is higher and the user's affinity conforms to such higher value, it is more likely that the end user is interested in viewing the advertisement.

Combined Reverse Demographic and Affinity Ranking Selection Methods

According to other embodiments one of the reverse demographic selection methods and one of the affinity ranking selection method are combined to select advertisements to send to the end user. For example one of the affinity ranking methods is used as a tie breaker of the reverse demographic selection methods. For example, using absolute reverse demographic will result in a given set of advertisements from which to choose to send to the user. These advertisements then are processed to determine those that conform to an absolute affinity ranking method. The resulting subset of advertisements, or a portion of such subset then is sent to the end user. Relative affinity ranking of the absolute reverse demographic matches also may be used in an embodiment. Similarly, absolute affinity ranking of the relative reverse demographic matches may be used, or relative affinity ranking of the relative reverse demographic matches may be used.

Alternatively, a reverse demographic method may be used as a tie breaker for an affinity ranking method. For example, using absolute affinity ranking will result in a given set of advertisements from which to choose to send to the user. These advertisements then are processed to determine those that conform to an absolute reverse demographic selection method. The resulting subset of advertisements, or a portion of such subset then is sent to the end user. Relative reverse demographic evaluation of the absolute affinity ranking matches also may be used in an embodiment. Similarly, absolute reverse demographic evaluation of the relative affinity ranking selections may be used, or relative reverse demographic selection of the relative affinity ranking selections may be used.

Embodiment with Advertisement Selection Screening at End User Computer

The participating consumers install a software program on their computer 14 which gathers end user data, performs advertising screening, performs playback screening and provides display ad accounting. The data gathering software operates as described for the prior embodiment (e.g., target criteria questionnaire(s) and in some embodiments monitoring the computing activities to update the end user data). A significant difference of this embodiment compared to the embodiment described above is that the advertisement screening is performed at the end user computer. Such embodiment has a higher degree of privacy for the end user.

To perform the advertisement screening, the ASP computer 52 periodically sends the end user computer the advertising data 54 (excluding the ad copy) for new advertisements. Such data 54 includes the respective target criteria information for the ads. In some embodiments, the data 54 is an advertisement filter 65 which is embodied by executable computer program instructions and the target criteria data 58. In another embodiment the filter 65 is merely the target criteria 58 along with an identification of a generic filter already stored on the end user computer. The end user computer then executes the generic filter or the received filter computer program instructions. The target criteria information 58 are parameters for the filter. All or a portion of the end user data 66, 67 serves as inputs to the respective filters. Preferably each filter is designed to generate a normalized output, such as a number from 0–100. The normalized output allows the filter processing results to be compared for each advertisements. These results are used to select an advertisement to be stored for display. Thus, the end user computer determines which advertisements are to be displayed. The end user computer then requests to receive the advertisement. In one embodiment, the advertising service provider computer receives the request and downloads the advertising copy to the end user. In another embodiment, the advertisement is accessed as a web page. The end user computer addresses the advertisement as a web page. Such address may be part of the data 54 sent to the end user computer or may be part of a subsequent request from the end user computer specifically asking for the address of a specific advertisement (e.g., identified by a code or index).

The end user computer then stores the advertisement copy or advertisement web page address. The advertising data 54 also includes playback criteria for the advertisements. A playback manager program determines when to display an advertisement on the end user computer. For example, ads may be displayed while the end user is off-line and the computer is idle, or while the computer is loading a program. In some embodiments ads may be scheduled at specific times and may preempt the display or may appear as a banner across a portion of the display. In other embodiments the ads appear while the user is on-line. In some embodiments the advertisement is a web page accessible over the internet. In such case, the advertisement still may be displayed while on-line or off-line. If requested while off-line then the web page is immediately displayed if a copy is stored on the end user computer. Otherwise, the end-user computer establishes an on-line connection to retrieve the web page. In some instances the web page may be located in memory and displayed without having to go on-line. If such web page includes hyperlinks and the end user clicks on a hyperlink then an online connection is formed. As still another alternative the hyper-link function can be disabled while the end user is off-line (e.g., if desired by the end user).

For each advertisement displayed on the end user computer according to the methods of this invention, the ad display manager program stores an accounting entry into a log of ad display accounting data 67. The entry includes an identification code for the advertisement, a time and date stamp and a time duration during which the advertisement was shown. In some embodiments, the entry also includes a destination web page of where the end user hyper-linked to after viewing the advertisement. The ad display accounting data 67 is sent to the ASP computer 52 periodically or aperiodically. Such accounting data 67 enables the advertising service provider to provide information to the participating advertisers concerning their advertisements. Such information also may be used for determining the value of the advertisement bandwidth provided by the ASP 52 and for determining how much to charge participating advertisers.

The advertisement screening performed at the end user computer 14 for this embodiment may include any of the screening methods described above, such as the absolute reverse demographic selection method, the relative reverse demographic selection method, the absolute affinity ranking selection method, the relative affinity ranking selection method, or a combined reverse demographic and affinity ranking selection methods. For embodiments in which advertising filter computer program instructions are downloaded to the end user computer any method using any of the end user data 66, 67 or other data derivable from the end user computer may be used to screen a given advertisement. This is because the filter for a given advertisement can be custom designed. There is a preference, however, that the output of the filter be compatible with the outputs of other filters so that the results of the filters can be compared.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for distributing advertisements for display on an end user computer, comprising the steps of:

storing advertisement information on a service provider computer for each one of a plurality of advertisements, the advertising information for each respective advertisement including target selection criteria and playback criteria;

storing data pertaining to an end user on an end user computer;

processing the advertisement information for a given advertisement using at least a portion of the end user information to determine whether to display the given advertisement at the end user computer; and scheduling the display of the given advertisement at the end user computer using the playback criteria corresponding to the given advertisement; and in which the step of storing advertising information comprises storing, for each one of the plurality of advertisements, corresponding target criteria data, in which the target criteria data includes a minimum affinity ranking for the corresponding advertisement, in which the step of storing end user data comprises storing consumer affinity data for prescribed categories of advertisements, in which the at least a portion of the end user data includes an affinity ranking for a select advertising category, and in which the step of processing comprises the step of identifying an advertisement in an advertising category which has a minimum affinity ranking less than the corresponding affinity ranking for the select advertising category.

2. A method for distributing advertisements for display on an end user computer, comprising the steps of:

storing advertisement information on a service provider computer for each one of a plurality of advertisements, the advertising information for each respective advertisement including target selection criteria and playback criteria;

storing data pertaining to an end user on an end user computer;

processing the advertisement information for a given advertisement using at least a portion of the end user information to determine whether to display the given advertisement at the end user computer; and scheduling the display of the given advertisement at the end user computer using the playback criteria corresponding to the given advertisement; and in which the step of storing advertising information includes storing, for each one of the plurality of advertisements, corresponding target criteria data, in which the target criteria data includes a minimum affinity ranking for the corresponding advertisement, in which the step of storing end user data comprises storing consumer affinity data for prescribed categories of advertisements, in which the at least a portion of the end user data includes an affinity ranking for a select advertising category, and in which the step of processing comprises the step of identifying an advertisement in an advertising category which has a minimum affinity ranking less than the corresponding affinity ranking for the select advertising category.

3. A system for distributing advertisements, comprising:

a service provider computer having memory which stores advertising information, including target criteria; and an end user computer, including memory which stores end user data, and processing means which sends a request to the service provider computer requesting that an advertisement be sent to the end user, wherein the sent request specifies at least a portion of end user data;

wherein the service provider computer further includes processing means for processing the request sent by the end user computer to identify an advertisement to send to the end user based upon the at least a portion of the end user data included in the request;

in which for each advertisement in the advertising data there is corresponding target criteria data, in which the target criteria data includes a minimum affinity ranking for the corresponding advertisement, in which the end user data includes consumer affinity ranking data for prescribed categories of advertisements, in which the sent request includes an affinity ranking for a select advertising category, and in which the service provider computer's processing means uses affinity ranking to identify an advertisement in an advertising category specified in the request which has a minimum affinity ranking less than the corresponding affinity ranking for the select advertising category.

4. A system for distributing advertisements, comprising:

a service provider computer having memory which stores advertising information, including target criteria; and an end user computer, including memory which stores end user data, and processing means which sends a request to the service provider computer requesting that an advertisement be sent to the end user, wherein the sent request specifies at least a portion of end user data;

wherein the service provider computer further includes processing means for processing the request sent by the end user computer to identify an advertisement to send to the end user based upon the at least a portion of the end user data included in the request;

in which for each advertisement in the advertising data there is corresponding target criteria data, in which the target criteria data includes target consumer demographic data for the corresponding advertisement, in which the end user data includes consumer demographic data corresponding to an end user of the end user computer, and in which the service provider computer's processing means uses absolute reverse demographics to identify an advertisement having corresponding target consumer data encompassing the consumer demographic data specified in the request; and in which the target criteria data includes a minimum affinity ranking for the corresponding advertisement, in which the end user data includes consumer affinity ranking data for prescribed categories of advertisements, in which the sent request includes an affinity ranking for a select advertising category, and in which the service provider computer's processing means also uses affinity ranking to identify an advertisement in an advertising category specified in the request which has a minimum affinity ranking less than the corresponding affinity ranking for the select advertising category.

5. A method for distributing an advertisement for display on an end user computer, comprising the steps of:

storing target criteria data on a service provider computer for each one of a plurality of advertisements;

storing data pertaining to an end user on an end user computer;

forming an on-line connection by which the end user computer can send a message to the service provider computer;

sending from the end user computer to the service provider computer a request to receive an advertisement, wherein the request includes at least a portion of the end user data;

processing the request at the service provider computer to identify an advertisement to send to the end user, wherein the advertisement to send is identified by comparing the at least a portion of the end user data and the target criteria data;

storing advertisement data on the service provider computer for each one of a plurality of advertisements, including the identified advertisement; and after the step of processing, electronically sending the identified advertisement to the end user computer;

in which the step of storing advertising data includes storing, for each one of the plurality of advertisements, corresponding target criteria data, in which the target criteria data includes a minimum affinity ranking for the corresponding advertisement, in which the step of storing end user data comprises storing consumer affinity data for prescribed categories of advertisements, in which the at least a portion of the end user data included in the sent request includes an affinity ranking for a select advertising category, and in which the step of processing the request comprises the step of identifying an advertisement in an advertising category specified in the request which has a minimum affinity ranking less than the corresponding affinity ranking for the select advertising category.

6. A method for distributing an advertisement for display on an end user computer, comprising the steps of:

storing target criteria data on a service provider computer for each one of a plurality of advertisements;

storing data pertaining to an end user on an end user computer;

forming an on-line connection by which the end user computer can send a message to the service provider computer;

sending from the end user computer to the service provider computer a request to receive an advertisement, wherein the request includes at least a portion of the end user data;

processing the request at the service provider computer to identify an advertisement to send to the end user, wherein the advertisement to send is identified by comparing the at least a portion of the end user data and the target criteria data;

storing advertisement data on the service provider computer for each one of a plurality of advertisements, including the identified advertisement; and after the step of processing, electronically sending the identified advertisement to the end user computer;

in which the step of storing advertising data includes storing, for each one of the plurality of advertisements, corresponding target criteria data, in which the target criteria data includes a minimum affinity ranking for the corresponding advertisement, in which the step of storing end user data comprises storing consumer affinity data for prescribed categories of advertisements, in which the at least a portion of the end user data included in the sent request includes an affinity ranking for a select advertising category, and in which the step of processing the request comprises the step of identifying an advertisement in an advertising category specified in the request which has a minimum affinity ranking less than the corresponding affinity ranking for the select advertising category.

7. A method for distributing an advertisement for display on an end user computer, comprising the steps of:

storing target criteria data on a service provider computer for each one of a plurality of advertisements;

storing data pertaining to an end user on an end user computer;

forming an on-line connection by which the end user computer can send a message to the service provider computer;

sending from the end user computer to the service provider computer a request to receive an advertisement, wherein the request includes at least a portion of the end user data;

processing the request at the service provider computer to identify an advertisement to send to the end user, wherein the advertisement to send is identified by comparing the at least a portion of the end user data and the target criteria data;

storing advertisement data on the service provider computer for each one of a plurality of advertisements, including the identified advertisement; and after the step of processing, electronically sending the identified advertisement to the end user computer;

in which the target criteria data includes a minimum affinity ranking for the corresponding advertisement, in which the end user data includes consumer affinity ranking data for prescribed categories of advertisements, in which the sent request includes an affinity ranking for a select advertising category, and in which the step of processing the request comprises the step of identifying an advertisement in an advertising category specified in the request which has a minimum affinity ranking less than the corresponding affinity ranking for the select advertising category.

8. A method for distributing advertisements for display on an end user computer, comprising the steps of:

storing advertisement information on a service provider computer for each one of a plurality of advertisements, the advertising information for each respective advertisement including target selection criteria and playback criteria for scheduling the respective advertisement, wherein the playback criteria comprises at least one criterion from the criteria group consisting of: start date for scheduling the respective advertisement, expiration date for the respective advertisement, permissible time of day range within which the respective advertisement is to be displayed, absolute maximum number of times to the display the respective advertisement, absolute maximum amount of display time duration of the respective advertisement on a given end user computer, maximum number of times to the display the respective advertisement in a given time period, maximum amount of display time duration of the respective advertisement on a given end user computer in the given time period;

storing data pertaining to an end user on an end user computer;

processing the advertisement information for a first advertisement using at least a portion of the end user information to determine whether to send the given advertisement to the end user computer;

receiving the first advertisement and corresponding playback criteria at the end user computer for storage at the end user computer;

maintaining a data base of received advertisements at the end user computer, said data base comprising the first advertisement;

scheduling the first advertisement stored within the data base for display at the end user computer, the step of scheduling comprising testing at the end user computer the playback criteria corresponding to the first advertisement; and displaying the first advertisement at the end user computer during a time period complying with the playback criteria;

in which the step of storing advertising information comprises storing, for each one of the plurality of advertisements, corresponding target criteria data, in which the target criteria data includes a minimum affinity ranking for the corresponding advertisement, in which the step of storing end user data comprises storing consumer affinity data for prescribed categories of advertisements, in which the at least a portion of the end user data includes an affinity ranking for a select advertising category, and in which the step of processing comprises the step of identifying an advertisement in an advertising category which has a minimum affinity ranking less than the corresponding affinity ranking for the select advertising category.

9. A method for distributing advertisements for display on an end user computer, comprising the steps of:

storing advertisement information on a service provider computer for each one of a plurality of advertisements, the advertising information for each respective advertisement including target selection criteria and playback criteria for scheduling the respective advertisement, wherein the playback criteria comprises at least one criterion from the criteria group consisting of: start date for scheduling the respective advertisement, expiration date for the respective advertisement, permissible time of day range within which the respective advertisement is to be displayed, absolute maximum number of times to the display the respective advertisement, absolute maximum amount of display time duration of the respective advertisement on a given end user computer, maximum number of times to the display the respective advertisement in a given time period, maximum amount of display time duration of the respective advertisement on a given end user computer in the given time period;

storing data pertaining to an end user on an end user computer;

processing the advertisement information for a first advertisement using at least a portion of the end user information to determine whether to send the given advertisement to the end user computer;

receiving the first advertisement and corresponding playback criteria at the end user computer for storage at the end user computer;

maintaining a data base of received advertisements at the end user computer, said data base comprising the first advertisement;

scheduling the first advertisement stored within the data base for display at the end user computer, the step of scheduling comprising testing at the end user computer the playback criteria corresponding to the first advertisement; and displaying the first advertisement at the end user computer during a time period complying with the playback criteria;

in which the step of storing advertising information includes storing, for each one of the plurality of advertisements, corresponding target criteria data, in which the target criteria data includes a minimum affinity ranking for the corresponding advertisement, in which the step of storing end user data comprises storing consumer affinity data for prescribed categories of advertisements, in which the at least a portion of the end user data includes an affinity ranking for a select advertising category, and in which the step of processing comprises the step of identifying an advertisement in an advertising category which has a minimum affinity ranking less than the corresponding affinity ranking for the select advertising category.

* * * * *